United States Patent
Perisho, Jr. et al.

(10) Patent No.: US 7,512,475 B2
(45) Date of Patent: Mar. 31, 2009

(54) AUTOMATIC LATERAL ACCELERATION LIMITING AND NON THREAT TARGET REJECTION

(75) Inventors: Robert A. Perisho, Jr., Russiaville, IN (US); Jeremy S. Greene, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 743 days.

(21) Appl. No.: 10/804,745

(22) Filed: Mar. 19, 2004

(65) Prior Publication Data

US 2005/0209766 A1    Sep. 22, 2005

(51) Int. Cl.
*B60K 31/00* (2006.01)
*G06F 19/00* (2006.01)

(52) U.S. Cl. .............................. 701/96; 701/72; 701/78; 180/170

(58) Field of Classification Search .................... 701/96, 701/72, 74, 78, 79, 301; 180/170
See application file for complete search history.

(56) References Cited

U.S. PATENT DOCUMENTS

| | | | |
|---|---|---|---|
| 5,467,283 A * | 11/1995 | Butsuen et al. | 701/301 |
| 5,627,756 A * | 5/1997 | Fukada et al. | 701/70 |
| 5,978,731 A | 11/1999 | Matsuda | |
| 6,141,617 A * | 10/2000 | Matsuda et al. | 701/72 |
| 6,175,799 B1 * | 1/2001 | Tsutsumi et al. | 701/96 |
| 6,295,493 B1 * | 9/2001 | Kawazoe | 701/38 |
| 6,317,679 B2 * | 11/2001 | Sielagoski et al. | 701/96 |
| 6,560,525 B1 | 5/2003 | Joyce et al. | 701/96 |
| 6,580,996 B1 | 6/2003 | Friedrich | 701/96 |
| 6,753,804 B2 * | 6/2004 | Miyahara | 342/70 |
| 6,763,904 B2 * | 7/2004 | Winner et al. | 180/167 |
| 7,051,827 B1 * | 5/2006 | Cardinal et al. | 180/174 |
| 2001/0007966 A1 | 7/2001 | Sielagoski et al. | |
| 2002/0165657 A1 | 11/2002 | Winner et al. | |
| 2002/0196034 A1 | 12/2002 | Kim | |

(Continued)

FOREIGN PATENT DOCUMENTS

DE    19848236    4/2000

(Continued)

OTHER PUBLICATIONS

EP Search Report dated Apr. 26, 2006.

(Continued)

*Primary Examiner*—Tan Q Nguyen
(74) *Attorney, Agent, or Firm*—Douglas D. Fekete

(57) ABSTRACT

The present invention provides a system and method for enabling a vehicle having adaptive cruise control to reduce its speed in a turn according to the vehicle's position within the turn as well as ignoring objects detected during the turn that are not in the vehicle's path. The method of the present invention includes the steps of operating the vehicle in an adaptive cruise control mode such that the vehicle is traveling at a set speed; determining whether the vehicle is in a turn in the vehicle's path by detecting change in the vehicle's lateral acceleration; and when the vehicle is determined to be in the turn, reducing the vehicle's speed according to the vehicle's position in the turn, monitoring for objects and maintaining the vehicle's speed if an object is positioned out of the path of the vehicle.

12 Claims, 5 Drawing Sheets

U.S. PATENT DOCUMENTS

2003/0201878 A1* 10/2003 Bai et al. .................... 340/435
2003/0204298 A1   10/2003 Ahmed-Zaid et al.
2004/0239179 A1* 12/2004 Kato et al. .................. 303/146

FOREIGN PATENT DOCUMENTS

DE         10149146      4/2003
EP         0778507       6/1997
EP         0945320       9/1999

OTHER PUBLICATIONS

EP Search Report Dated Jul. 18, 2006.

* cited by examiner

AUTOMATIC LATERAL ACCELERATION LIMITING AND NON THREAT TARGET REJECTION

TECHNICAL BACKGROUND

The present invention generally relates to a vehicle which contains an adaptive cruise control ("ACC") system. Specifically, this invention relates to a method and system for controlling a vehicle having an ACC system.

BACKGROUND OF THE INVENTION

Cruise control systems for automotive vehicles are widely known in the art. In basic systems, the driver of a vehicle attains a desired vehicle speed and initiates the cruise control system at a set speed. The vehicle then travels at the set speed until the driver applies the brakes or turns off the system.

Advances in vehicle electronics and sensory technology have provided for cruise control systems that go a step beyond the system described above. ACC systems are not only capable of maintaining a set vehicle speed, but they also include object sensing technology, such as radar, laser, or other types of sensing systems, that will detect a vehicle in the path of the vehicle that contains the ACC (or other form of cruise control) system (i.e., "host vehicle"). Accordingly, ACC is an enhancement to traditional cruise control by automatically adjusting a set speed to allow a vehicle to adapt to moving traffic.

Under normal driving conditions the ACC system is engaged with a set speed equal to a maximum speed that is desired by the vehicle driver, and the ACC system operates in a conventional cruise control mode. If the host vehicle is following too closely behind a vehicle in the path of the host vehicle ("in-path vehicle"), the ACC system automatically reduces the host vehicle's speed by reducing the throttle and/or applying the brakes to obtain a predetermined safe following interval. When the in-path vehicle approaches slow traffic and the ACC system reduces the speed of the host vehicle below a minimum speed for ACC operation, the ACC automatically disengages and the driver manually follows slower in-path vehicles in the slow traffic. When the slow traffic is no longer in front of the host-vehicle, the driver must manually accelerate the host vehicle to a speed above the minimum speed for ACC operation before the ACC system is able to resume acceleration to the set speed. In typical ACC systems, objects moving at approximately 30% (thirty percent) or less of the host vehicle's speed are disregarded for braking purposes (i.e., the vehicle's brakes are not applied, the throttle is not reduced, and no other action is taken to slow down the host vehicle).

Traditional ACC systems were designed to enable a vehicle to react to moving targets presented by normal traffic conditions under extended cruise control operation and when the vehicle is traveling at speeds above forty (40) kilometers per hour (KPH). "Stop-and-go" ACC systems are an enhanced form of ACC that overcome some of the shortcomings of ACC systems. Stop-and-go ACC systems enable the host vehicle to follow an in-path vehicle in slower traffic conditions such as stop and go traffic. Therefore, while ACC stop-and-go systems improve the performance of traditional ACC systems, both ACC and ACC stop-and-go systems still provide problems for the driver of the vehicle.

A first problem presented by ACC and ACC stop-and-go systems is that because there may be an abundance of out-of-path stationary targets encountered by a vehicle during a turn, braking for each of these targets can cause driver discomfort. Current ACC and ACC stop-and-go systems are not capable of disregarding the stationary targets not within the vehicle's path (i.e., "out-of-path" targets). An example is shown in FIG. 1, in which vehicle 102 utilizes a prior art ACC or ACC stop-and-go system. Vehicle 102 is shown at three (4) different times—time one ("T1"), time two ("T2"), time three ("T3") and time four ("T4"). At T1, vehicle 102 is shown traveling in the direction of arrow 109 at a cruise speed on road 104. In-path indicator 103 highlights objects that are in the path of vehicle 102 as vehicle 102 travels. As vehicle 102 enters a left turn at T2, which is illustrated by arrow 106 ("turn 106"), in-path indicator 103 illustrates that stationary object 110 is within vehicle's 102 path. Object 110 may be any stationary object, for example, a traffic light, a stopped vehicle, construction equipment, a person, an animal, a sign, or any other object. Since object 110 is in the path of vehicle 102, the ACC or ACC stop-and-go system contained by vehicle 102 appropriately instructs vehicle 102 to either brake or reduce its speed in some fashion. This situation, however, is an unnecessary braking situation because vehicle 110 is not a threat to vehicle 102 at T2.

As vehicle 102 is midway through turn 106 at T3, vehicle 102 detects stationary object 112, as highlighted by in-path indicator 103. Because object 112 is in the path of vehicle 102, vehicle's 102 ACC or ACC stop-and-go system brakes and reduces vehicle's 102 speed. Object 112, however, like object 110, is non-threatening to vehicle 102. Therefore, in making turn 106, vehicle's 102 ACC or ACC stop-and-go system unnecessarily reduces the speed of vehicle 102. This excessive braking may annoy and provide discomfort to the driver of vehicle 102.

Another problem presented by current ACC and ACC stop-and-go systems is that the systems' maintenance of a set cruise speed in turning situations may cause excessive lateral acceleration and the possible loss of control of the host vehicle. An example is shown in FIG. 1. As vehicle 102 enters turn 106, maintaining the cruise speed may cause excessive lateral acceleration. Vehicle 102, shown at T4, illustrates how the excessive lateral acceleration can cause vehicle's 102 tail to careen out of vehicle's 102 desired turn 106. Excessive lateral acceleration such as that described in this example may result in injury to the driver of vehicle 102 as well as to nearby vehicle drivers or pedestrians.

SUMMARY OF THE INVENTION

The method and system of the present invention provides smooth vehicle control in turning situations both by limiting lateral acceleration during the vehicle turn and by eliminating braking for out-of-path targets.

In one form of the present invention, a method of controlling a vehicle having an adaptive cruise control system capable of obtaining the vehicle's lateral acceleration is provided, the method including the steps of determining when the vehicle is in a turn based on a detected change in the vehicle's lateral acceleration; and reducing the vehicle's speed according to the vehicle's position in the turn.

In another form of the present invention, a method of controlling a vehicle is provided, the method including the steps of operating the vehicle in an adaptive cruise control mode such that the vehicle is traveling at a set speed; determining whether the vehicle is in a turn in the vehicle's path by detecting change in the vehicle's lateral acceleration; and when the vehicle is determined to be in the turn, reducing the vehicle's speed according to the vehicle's position in the turn, monitoring for objects and maintaining the vehicle's speed if an object is positioned out of the path of the vehicle.

In still another form, the present invention provides a method of controlling a vehicle operating in an adaptive cruise control mode and traveling at a set speed, the method including the steps of estimating a path for the vehicle in a turn; associating the vehicle path with a first zone area, the first zone area including the turn; and reducing the vehicle's speed when a detected object is determined to be in the first zone area and maintaining the vehicle's speed when a detected object is determined to be outside of the first zone area.

In yet another form of the present invention, a system is provided for use in controlling a vehicle, the system including an adaptive cruise control system; a controller in communication with the adaptive cruise control system and capable of determining when the vehicle is in a turn, the controller operative to reduce the vehicle's speed according to the vehicle's position in the turn; at least one lateral acceleration sensor for generating a signal corresponding to the vehicle's lateral acceleration, the lateral acceleration sensor in electrical communication with the controller and operative to detect a change in the vehicle's lateral acceleration; and at least one object detection sensor for detecting an object in the path of the vehicle during the turn, the object detection sensor in electrical communication with the controller, wherein the controller includes control logic operative to determine whether the object is in the vehicle's path during the turn and ignoring the object for braking purposes when the object is not determined to be in the vehicle's path.

In another form of the present invention, a method of controlling a vehicle in a turn is provided, the method including the steps of measuring the vehicle's speed; measuring the vehicle's lateral acceleration; estimating the radius of curvature of the vehicle's path based on the vehicle's speed and lateral acceleration; and when the combination of the vehicle's speed and the vehicle path's radius of curvature exceeds a predetermined maximum lateral acceleration limit, reducing the vehicle's speed.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
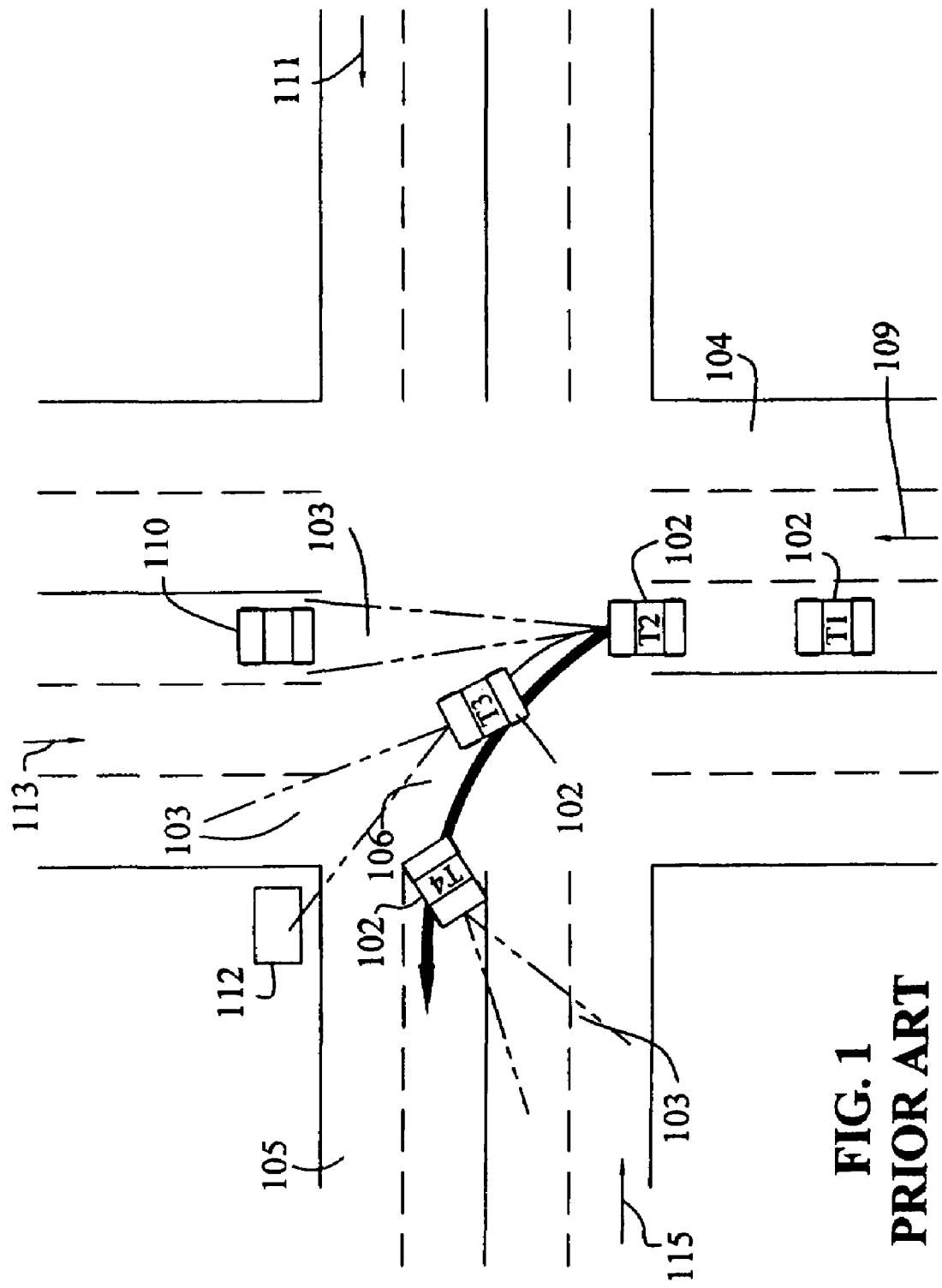
FIG. 1 is a diagrammatic view of a vehicle having a prior art ACC or ACC stop-and-go ACC system in a turn situation.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

Figure 2:
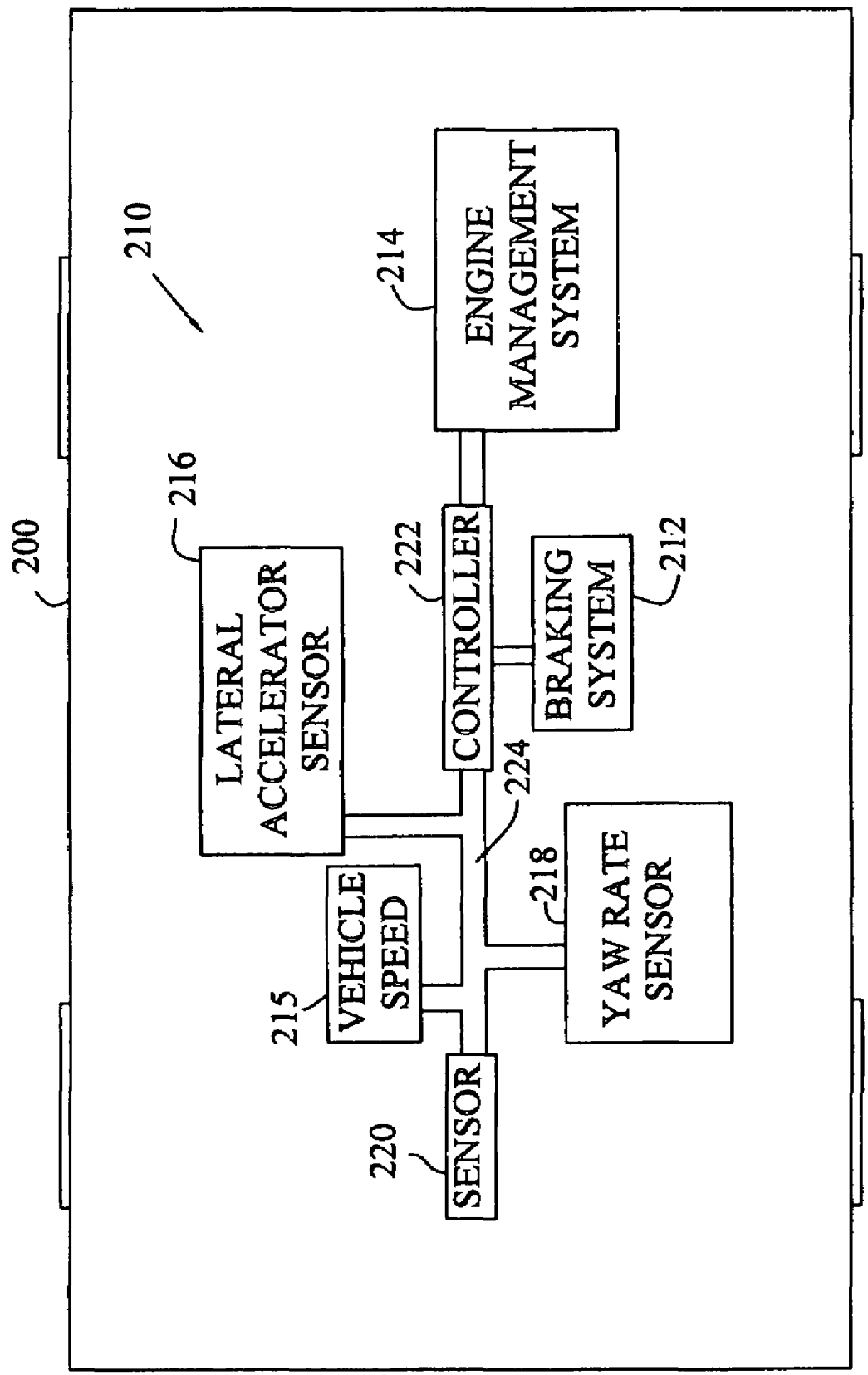
FIG. 2 is a schematic view of a vehicle including the system of the present invention.

FIG. 2 shows the inventive stop-and-go adaptive cruise control (ACC) system 210 of the present invention. While system 210 is described within the context of an ACC stop-and-go system, it is contemplated that system 210 may also be used in a traditional ACC system. System 210 is implemented in host vehicle 200 that has braking system 212 and engine management system 214. System 210 includes vehicle speed sensor 215 for measuring vehicle's 200 speed, lateral acceleration sensor 216 for measuring the acceleration of vehicle 200 in the direction of vehicle's 200 lateral axis in a turn, and yaw rate sensor 218 for measuring the rate that vehicle 200 is rotating about its vertical axis. System 210 also includes sensor 220 for generating a range signal corresponding to a distance between host vehicle 200 and a target, and a target range rate signal corresponding to a rate that the distance between host vehicle 200 and the target is changing. Controller 222 is in electronic communication with sensors 215, 216, 218, 220 over communication bus 224.

Braking system 212 may include any braking system that is capable of reducing the speed of vehicle 200. Such braking mechanisms include a transmission controller that is capable of downshifting a transmission of vehicle 200, a throttle that may be reduced to decrease the speed of vehicle 200, a brake booster controller equivalent to the vehicle's driver applying the brakes, etc.

Engine management system 214 may include any known vehicle component or system that may be used to adjust the acceleration of vehicle 200. Such components and/or systems may include a vehicle accelerator, a fuel and air intake control system, or an engine timing controller.

Sensor 220 may include any object detecting sensor known in the art, including a radar sensor (e.g., doppler or microwave radar), a laser radar (LIDAR) sensor, an ultrasonic radar, a forward looking IR (FLIR), a stereo imaging system, or a combination of a radar sensor and a camera system. Sensor 220 functions to detect objects positioned in the path of vehicle 200. For example, shown in FIGS. 1 and 3, in-path indicators 103, 303 depict sensor's 220 capability to detect an object in the path of vehicles 103, 303, respectively. Sensor 220 may be used alone or in combination with other sensors, and depending on the type of sensor 220 used, sensor 220 may also be mounted alone or in multiples. In an exemplary embodiment of the present invention, sensor 220 is front mounted so as to provide a wide sensor field of view (FOV) covering a minimum turn radius of ten (10) meters. Sensor 220 may also be used in some embodiments of system 210 to gather additional information useful to controller 222 in determining the threat of the object to vehicle 200 and the appropriate actions to carry out. This additional information includes the target angle of the object relative to vehicle 200 and the yaw rate of the object relative to vehicle 200. In other embodiments of system 210, sensors other than sensor 220 may be provided to measure both the target angle and the yaw rate of the object (i.e., target).

Controller 222 may be a microprocessor-based controller such as a computer having a central processing unit, random access and/or read-only memory, and associated input and output busses. Controller 222 may be a portion of a main control unit such as vehicle's 200 main controller, or controller 222 may be a stand-alone controller. Controller 222 contains logic for enabling vehicle 200 to reduce its speed in a turn as well as to ignore objects positioned outside of a specific zone area, as will be described in further detail below with regards to FIGS. 3 and 4.

Figure 3:
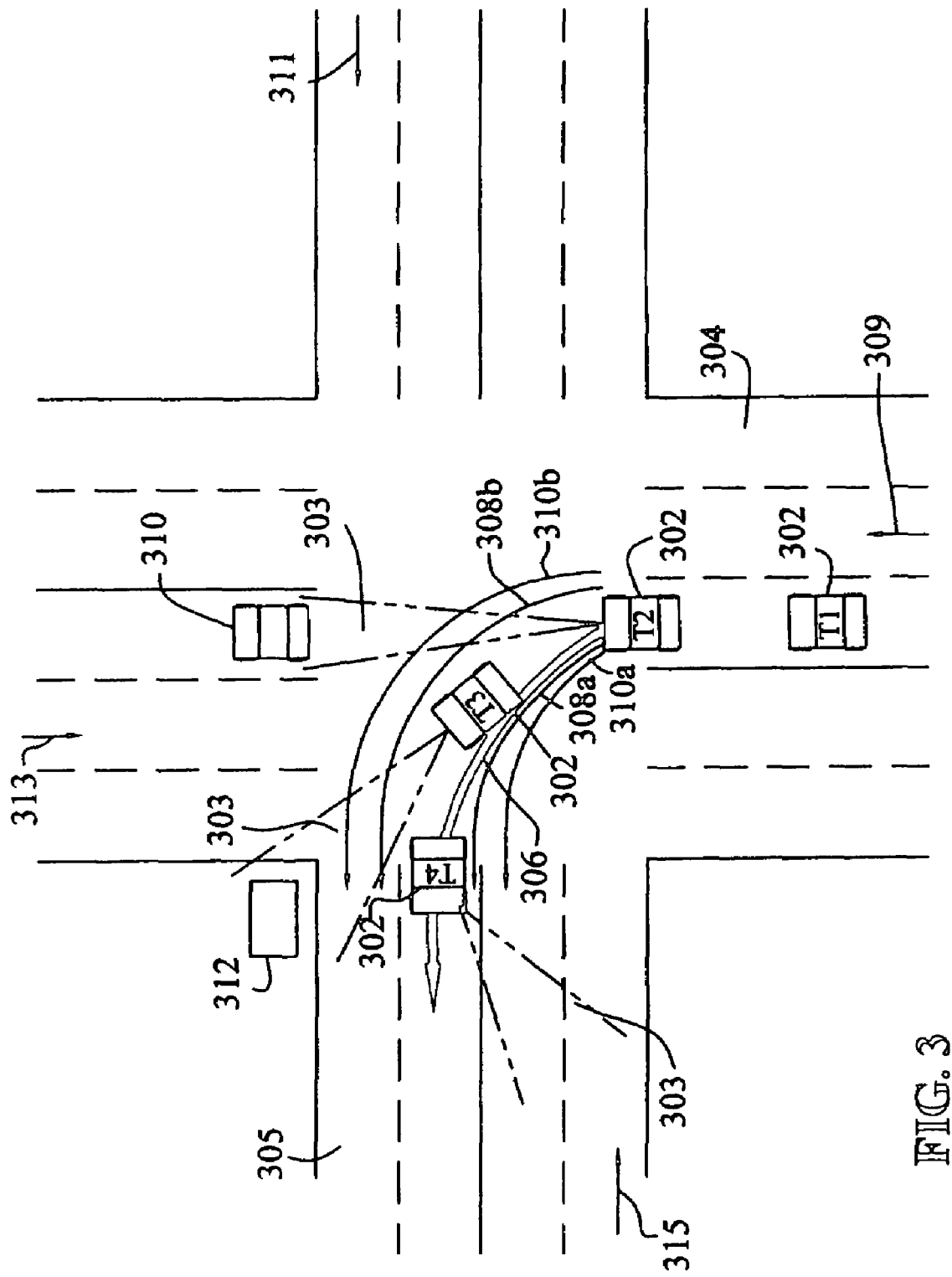
FIG. 3 is a diagrammatic view of a vehicle having the inventive system in a turn situation.
Figure 4:
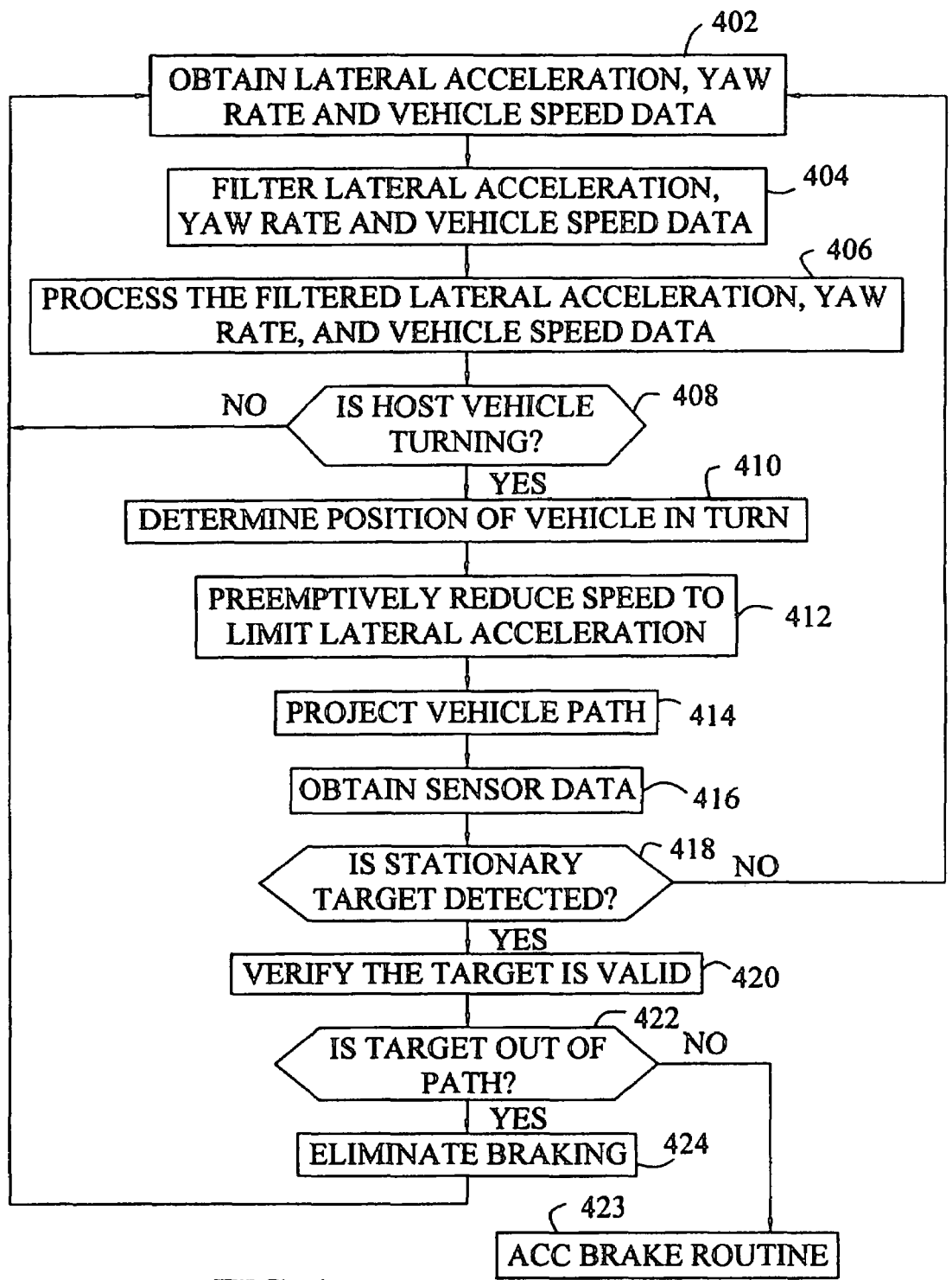
FIG. 4 is a illustrative view of the method of the present invention.

FIGS. 3 and 4 will now be used in conjunction to describe the method and system of the present invention. Shown in FIG. 3 is vehicle 302 implementing system 210 (FIG. 2) of the present invention. Vehicle 302 is shown in FIG. 3 at T1, T2, T3 and T4. At T1, vehicle 302 is displayed traveling at a cruise speed in the direction of arrow 309 on road 304. As vehicle 302 enters the turn at T2, controller 222 executes the logic steps illustrated in FIG. 4. In an exemplary embodiment of system 210, controller 222 stores the logic steps in memory as instructions to be executed by a processor. As indicated by steps 402-408, controller 222 continuously monitors vehicle's 302 speed, lateral acceleration and yaw rate, each of which is provided to controller 222 as signals from sensors 215, 216, 218 (FIG. 2). At step 402, controller 222 obtains and stores vehicle's 302 lateral acceleration data, yaw rate data and vehicle speed data. At step 404, controller 222 uses a time lag filter to filter the raw lateral acceleration, yaw rate and vehicle speed data, and at step 406, controller 222 processes this filtered data.

Figure 5:
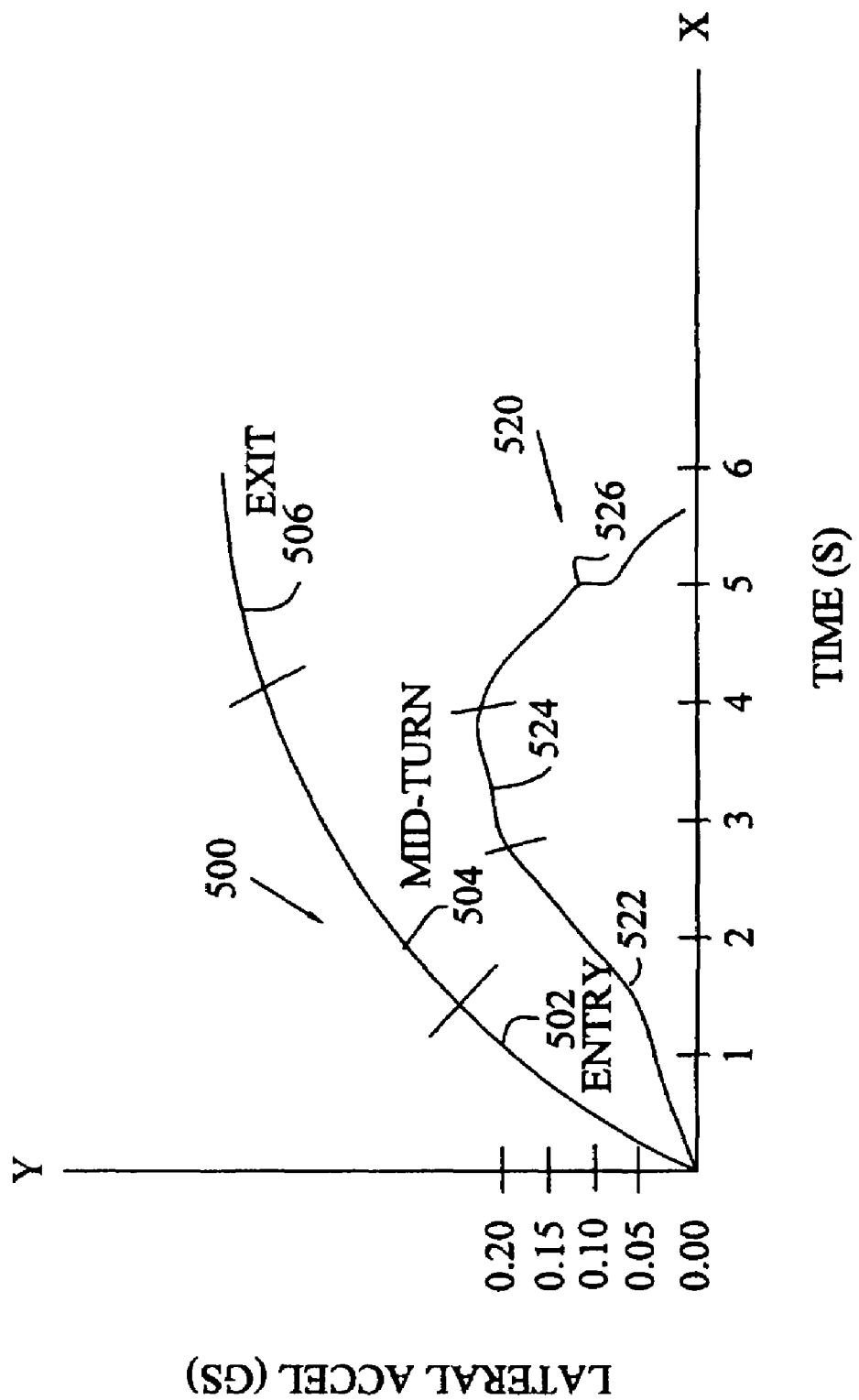
FIG. 5 charts the lateral acceleration of a vehicle in a turn situation.

Charted in FIG. 5 is the lateral acceleration of a vehicle in a turn versus the time it takes for the vehicle to complete the turn. The X axis denotes the duration of time it takes the vehicle to complete the turn. The Y axis denotes the lateral acceleration of the vehicle during the turn. The actual path of a vehicle in the turn is illustrated as curve 500. Curve 500 exhibits the path that a vehicle follows in a turn. Curve 500 may be broken into three (3) sections—entry section 502, middle section 504 and exit section 506. At entry section 502 of turn 500, a vehicle enters the turn. At midsection 504 of turn 500, the vehicle completes the middle of the turn, and at exit section 506, the vehicle completes the turn.

Controller 222 (FIG. 2) may contain logic enabling it to use known characteristics of curve 500 to predict not only whether vehicle 302 is in a turn, but also to determine the position in which vehicle 302 is located in the turn, e.g., in the entry of a turn, in the middle of a turn, or in the exit of a turn. Curve 520 depicts a vehicle's lateral acceleration during the turn illustrated by curve 500. At entry section 522 of curve 520, the vehicle's lateral acceleration increases from zero (0) Gs to about 0.15 Gs at a steady rate. At midsection 504 of curve 520, the lateral acceleration of the vehicle increases less over time and, when charted, has close to a constant curve. The lateral acceleration of the vehicle reaches its maximum value, 0.20 Gs, during midsection 524 of curve 520. At exit section 526, the lateral acceleration becomes nearly constant before decreasing back to zero (0) as the turn is completed. Based on curve 520 or other curves derived by the performance of testing, the following characteristics of a vehicle's lateral acceleration in a turn may be derived: 1) in the entry of a turn, the lateral acceleration of a vehicle is likely to rapidly increase from zero (0) Gs over time; 2) in the middle of a turn, the lateral acceleration of a vehicle is likely to show a constant increase before reaching a maximum value; and 3) in the exit of a turn, the lateral acceleration of a vehicle is likely to remain steady for a short period of time before decreasing. These characteristics may be used to program controller 222 both to deduce when a vehicle is in a turning situation and to determine at what position the vehicle is in within the turn.

Controller 222 also uses other data obtained from vehicle 302 to predict whether vehicle 302 is in a turn. This data includes vehicle's 302 yaw rate, which is obtained from yaw rate sensor 218; vehicle's 302 yaw rate of change, which controller 222 calculates based on the yaw rate; and vehicle's 302 speed, which is obtained from vehicle speed sensor 215. Yaw rate basically indicates that vehicle 302 is turning on the axis that runs vertically through the center of the vehicle. Vehicle speed data may be combined with lateral acceleration data to indicate the radius of curvature (ROC) or a road, i.e., how tight the turn is.

Referring back to FIGS. 3 and 4, if controller 222 determines at step 408 that vehicle 302 is not turning, then controller 222 continues to monitor vehicle's 302 lateral acceleration, yaw rate and vehicle speed by obtaining lateral acceleration, yaw rate and vehicle speed data at step 402. However, if controller 222 determines that vehicle 302 is turning, at step 410 controller 222 determines the position of vehicle 302 in the turn.

As explained above, controller 222 determines vehicle's 302 position within the turn by using programmed instructions that recognize patterns exhibited in lateral acceleration data when a vehicle is in the entry of a turn, in the middle of a turn, or exiting a turn. After controller 222 determines at step 410 where in turn 306 vehicle 302 is positioned, controller 222 then instructs braking system 212 at step 412 to preemptively reduce vehicle's 302 speed so that vehicle's 302 lateral acceleration speed is reduced o a predetermined maximum limit according to vehicle's 302 position in the turn. For example, vehicle 302 may have been set at a cruise speed of fifty (50) miles per hour (MPH) at T2. However, controller 222 may contain program instructions that indicate that when vehicle 302 is in the entry of a turn, vehicle's 302 speed should be reduced inversely as the ROC of the turn is reduced. For the same speed, a tighter turn increases the lateral acceleration. For a constant curve, an increase in speed increases the lateral acceleration. By estimating the ROC continuously, when the combination of vehicle's 302 speed and the turn's ROC exceeds the predetermined maximum lateral acceleration limit, controller 222 reduces the speed of vehicle 302. The formula to find lateral acceleration is $LA = v^2/ROC$ (where LA is lateral acceleration and v is speed), so both speed and ROC affect lateral acceleration.

Upon reducing vehicle's 302 speed, controller 222 may use vehicle's 302 lateral acceleration, yaw rate, yaw rate of change and speed data to estimate the path of vehicle 302 in turn 306 at step 414. Path estimation is a projection of where vehicle 302 will be at the next sample time. Vehicle's 302 path estimation is a vector whose longitudinal component is based on vehicle's 302 current speed plus the change in vehicle's 302 speed (delta speed). The angle component of vehicle's 302 path estimation is based on vehicle's 302 lateral acceleration, lateral acceleration rate of change, yaw rate and yaw rate of change. The net result is an estimate of the new position of vehicle 302 at time zero (0) plus the change in time (delta time). Referring to FIG. 3, the projected path of vehicle 302 in turn 306 is marked by boundaries 308a, 308b. Controller 222 does not instruct braking system 212 to brake or reduce vehicle's 302 speed in turn 306 when an object detected by sensor 220 (FIG. 2) is outside of projected path boundaries 308a, 308b. Further, in the case that the projected path of vehicle 302 is not accurate and boundaries 308a, 308b are incorrectly determined, controller 222 may also determine a safety zone outside of path boundaries 308a, 308b. The safety zone, bounded by safety zone boundaries 310a, 310b, is similar to boundaries 308a, 308b in that controller 222 does not instruct braking system 212 to brake or reduce vehicle's 302 speed based upon sensor's 220 detection of an object outside of safety zone boundaries 310a, 310b.

After controller projects the path of vehicle 302 at step 414, controller 222 obtains sensor data from sensor 220 at step 416 to determine whether stationary object 310 has been detected. As stated above, in-path indicator 303 depicts what, if anything, is detected by sensor 220 as being in the path of vehicle 302. As vehicle 302 enters turn 306, in-path indicator 303 highlights stopped vehicle 302, thus indicating at step 418 that vehicle's sensor 220 detects vehicle 302 as being in vehicle's 302 path. If sensor 220 does not detect target 310, then controller 222 re-executes the logic steps of FIG. 4 beginning at step 402.

Upon detecting target 310, controller 222 verifies at step 420 that stopped vehicle 302 is valid by subjecting target 310 to persistence filtering. The persistence filtering includes using vehicle's 302 yaw rate, yaw rate of change, speed, range (i.e., signal corresponding to a distance between vehicle 302 and target 310), range rate (i.e., signal corresponding to a rate that the distance between vehicle 302 and target 310 is changing), the angle of target 310 and the ROC of turn 306 to verify target 310. Target 310 has a range rate equal to but opposite vehicle's 302 speed. By subtracting the range and angle data from vehicle's 302 speed, controller 222 can determine the actual speed and location of target 310. If the range decreases and the range rate changes inversely to vehicle's 302 delta speed, then target 310 is stationary. If controller 222 determines that target 310 is stationary multiple times, then target 310 is considered to be verified. If target 310 is not directly in front of vehicle 302, e.g., in a curve, then controller 222 performs the same verification test using vector geometry.

When controller 222 has verified that stopped vehicle 302 is a valid target, controller 222 next determines at step 422 whether vehicle 302 out-of-path. Because vehicle 302 is neither within projected path boundaries 308a, 308b nor within safety zone boundaries 310a, 310b, controller 222 determines that vehicle 302 is out-of-path. Accordingly, whereas a prior art ACC or ACC stop-and-go system would cause vehicle 302 to reduce its speed because of detected vehicle 302, controller 222 eliminates system's 210 braking system at step 424 because stopped vehicle 302 is outside of both projected path boundaries 308a, 308b and safety zone boundaries 310a, 310b.

A similar situation is presented at T3. Controller 222 determines at step 410 that vehicle 302 is midway through turn 306 and adjusts vehicle's 302 speed according to programmed instructions that provide a predetermined lateral acceleration limit for vehicle 302 midway through its turn. After projecting vehicle's 302 path at step 414, controller 222 then obtains sensor signal data from sensor 220 at step 416. In-path indicator 303 highlights a corner of target 312, thus indicating that target 312 has been detected at step 418. Once controller 222 verifies at step 420 that target 312 is a valid target, controller 222 determines at step 422 whether target 312 is out-of-path. Since target 312 is positioned outside of both projected path boundaries 308a, 308b and safety zone boundaries 310a, 310b, while prior art ACC or ACC stop-and-go systems would have caused vehicle 302 to once again reduce its speed due to the detection of target 312 during turn 306, inventive system 210 does not instruct braking system 212 to brake or otherwise reduce vehicle's 302 speed because target 312 is out-of-path. If controller 222 had determined that target 312 was in path, it would have instructed braking system 212 to initiate its brake routine.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method of controlling a vehicle having an adaptive cruise control system capable of controlling a vehicle speed and obtaining a vehicle lateral acceleration, said method comprising the steps of:
   measuring a lateral acceleration from a lateral acceleration sensor;
   detecting a change in a vehicle lateral acceleration based on a change in the measured lateral acceleration;
   determining when the vehicle is in a turn based on the detected change in the vehicle lateral acceleration; and
   if a vehicle is in a turn, reducing the vehicle speed according to the determination that the vehicle is in the turn and the detected change in the vehicle lateral acceleration.

2. The method of claim 1 wherein said step of determining includes steps of
   measuring the vehicle speed;
   measuring a vehicle yaw rate; and
   measuring a rate of change in the vehicle yaw rate.

3. The method of claim 2 wherein said step of determining further includes a step of utilizing speed data corresponding to the vehicle speed, yaw rate data corresponding to the vehicle yaw rate, and yaw rate of change data corresponding to the race of change in the vehicle yaw rate.

4. The method of claim 1 further comprising a step of determining the vehicle's position within the turn.

5. The method of claim 1 wherein said step of reducing the vehicle speed includes a step of reducing the speed if the vehicle lateral acceleration exceeds a predetermined limit.

6. A method of controlling a vehicle, said method comprising the steps of:
   operating the vehicle in an adaptive cruise control mode such that the vehicle is traveling at a vehicle speed;
   measuring a lateral acceleration from a lateral acceleration sensor;
   detecting a change in a vehicle lateral acceleration based on a change in the measured lateral acceleration;
   determining the vehicle path based on the detected change in the vehicle lateral acceleration;
   monitoring for objects;
   detecting a location of an object;
   determining whether the location of an object is within the vehicle path; and
   when the vehicle is determined to be in the turn, reducing the vehicle speed according to the determination that the vehicle is in the turn and the location of the object.

7. The method of claim 6 wherein said step of determining whether the vehicle is in a turn includes steps of
   measuring the vehicle speed;
   measuring a vehicle yaw rate; and
   measuring a change in the vehicle yaw rate.

8. The method of claim 6 further comprising a step of determining the vehicle's position within the turn.

9. The method of claim 8 wherein said step of reducing the vehicle speed includes a step of reducing the vehicle speed if the vehicle lateral acceleration exceeds a predetermined limit.

10. The method of claim 6 wherein said step of detecting an object includes steps of:
    measuring object range;
    measuring object range rate, said object range rate corresponding to a rate that the distance between the vehicle and the object is changing;

measuring object angle; and determining the radius of curvature of the vehicle's path.

11. The method claim of 10 wherein said step of monitoring includes a step of determining whether the detected object is in the vehicle's path.

12. The method of claim 11 wherein said step of monitoring includes a step of verifying that the object is in the vehicles path.

* * * * *